United States Patent
Rafteseth et al.

(10) Patent No.: US 10,480,698 B2
(45) Date of Patent: Nov. 19, 2019

(54) TUBE CONNECTOR

(71) Applicant: Kongsberg Automotive AS, Kongsberg (NO)

(72) Inventors: Tommy Rafteseth, Gjövik (NO); Geir Liaklev, Gjövik (NO); Henning Rud, Lillehammer (NO)

(73) Assignee: Kongsberg Automotive AS, Kongsberg (NO)

( * ) Notice: Subject to any disclaimer, the term of this patent is extended or adjusted under 35 U.S.C. 154(b) by 299 days.

(21) Appl. No.: 15/509,950

(22) PCT Filed: Sep. 19, 2014

(86) PCT No.: PCT/EP2014/069974
§ 371 (c)(1),
(2) Date: Mar. 9, 2017

(87) PCT Pub. No.: WO2016/041603
PCT Pub. Date: Mar. 24, 2016

(65) Prior Publication Data
US 2017/0336004 A1    Nov. 23, 2017

(51) Int. Cl.
*F16L 37/091*    (2006.01)
*F16L 37/092*    (2006.01)
*F16L 33/18*     (2006.01)

(52) U.S. Cl.
CPC .......... *F16L 37/0915* (2016.05); *F16L 33/18* (2013.01); *F16L 37/0925* (2013.01); *F16L 2201/80* (2013.01)

(58) Field of Classification Search
CPC .. F16L 37/092; F16L 37/0915; F16L 37/0925
(Continued)

(56) References Cited

U.S. PATENT DOCUMENTS 5,374,089 A * 12/1994 Davie ................... F16L 19/028
                                                    285/308
5,551,735 A *  9/1996 Takayanagi ......... F16L 37/0925
                                                    285/323
(Continued)

FOREIGN PATENT DOCUMENTS

DE         4002057 A1    2/1991
DE   102010008926 A1 *   8/2011   .......... F16L 37/0915
(Continued)

OTHER PUBLICATIONS

International Search Report and Written Opinion for PCT/EP2014/069974 dated Jun. 18, 2015; 12 pages.
(Continued)

*Primary Examiner* — David Bochna
(74) *Attorney, Agent, or Firm* — Howard & Howard Attorneys PLLC

(57) ABSTRACT

A tube connector for attachment to an end of a tube of a pressurized fluid system has a housing, a main sealing element, a gripping element and a cone element. The main sealing element is arranged for sealing an inner surface of the housing to an outer surface of a tube. The gripping element comprises a gripping edge for engaging with an outer surface of a tube. The cone element limits a movement of the grip-ping element. The tube connector further has an integrated release element. The release element has a tubular part, a top part and an environmental sealing. A release edge of the tubular part engages with the gripping element and the environmental sealing is adapted for sealing a receptacle formed in the housing of the environment.

16 Claims, 3 Drawing Sheets

Figure 1:
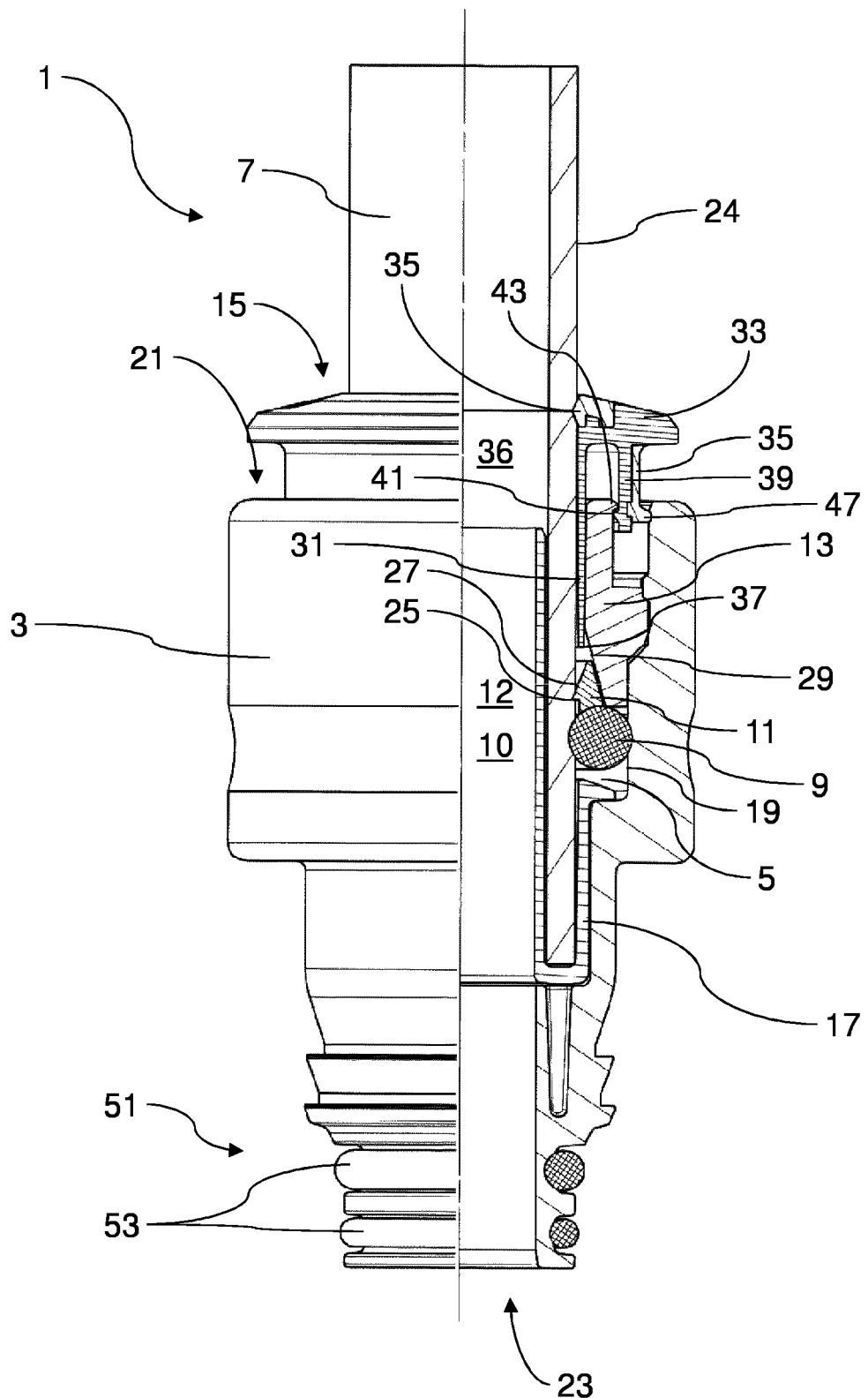

(58) Field of Classification Search
USPC .................................................. 285/307, 308
See application file for complete search history.

(56) References Cited

U.S. PATENT DOCUMENTS

| | | | |
|---|---|---|---|
| 5,553,895 A | 9/1996 | Woodward | |
| 5,570,910 A * | 11/1996 | Highlen | F16L 37/088 |
| | | | 285/308 |
| 5,580,100 A * | 12/1996 | Umezawa | F16L 37/0925 |
| | | | 285/308 |
| 6,183,020 B1 * | 2/2001 | Luft | F16L 37/088 |
| | | | 285/321 |
| 7,832,774 B2 * | 11/2010 | Densel | F16L 37/0842 |
| | | | 285/308 |
| 2003/0173779 A1 * | 9/2003 | Ezura | F16L 37/0915 |
| | | | 285/308 |
| 2013/0200607 A1 | 8/2013 | Rodenberg et al. | |

FOREIGN PATENT DOCUMENTS

| | | | |
|---|---|---|---|
| EP | 0579194 A1 | 1/1994 | |
| FR | 2978999 A1 * | 2/2013 | ............. F16L 55/11 |
| GB | 1024537 A | 3/1966 | |
| GB | 1494553 A | 12/1977 | |

OTHER PUBLICATIONS

English language abstract and computer-generated translation of DE 4002057 extracted from espacenet.com database on Jan. 31, 2017; 6 pages.

English language abstract and computer-generated translation of EP 05979194 extracted from espacenet.com database on Jan. 31, 2017; 8 pages.

* cited by examiner

TUBE CONNECTOR

This application is the U.S. National Stage of International Patent Application No. PCT/EP2014/069974, filed Sep. 19, 2014, the content of which is incorporated herein by reference.

The present invention relates to a tube connector for attachment to a tube of a pressurized fluid system. The tube connector comprises a housing, a main sealing element, a gripping element and a cone element. The housing comprises a receptacle for receiving a tube. The receptacle is delimited by an insertion end from which a tube can be inserted into the receptacle and an abutment end delimiting the maximum insertion of a tube into the housing. The main sealing element is provided for preventing a fluid from flowing out of a pressurized fluid system at a connection of a tube and the tube connector. The gripping element comprises a passage for receiving a tube and is arranged in the receptacle and comprises a gripping edge for engaging with an outer surface of a tube received in the passage of the gripping element. The cone element is arranged in the housing for delimiting a movement of the gripping element towards the insertion end.

Tube connectors of the kind described in the preceding paragraph for connecting a tube of a pressurized fluid system are known, for example, from international publications WO 2009/068932 A1 and WO 2009/068934 A1. The tube connector provides a means for connecting a tube to, for example, another tube of a pressurized fluid system. However, before connecting the tube to another element, at first a connection between the tube and the tube connector needs to be established. The connection between the tube and the tube connector has to meet several demands. Firstly, the connection needs to be sealed to prevent that any fluid evades from the pressurized fluid system. To this end the main sealing element is provided in the receptacle.

Secondly, the interior of the tube connector, i.e. the receptacle inside which the main sealing element and the gripping element are arranged, needs to be sealed against environmental influences such as dirt. Hence, prior art tube connectors are provided with an environmental sealing element which is arranged to prevent external particles, e.g. dirt and grease, from entering into the receptacle. If dirt enters the housing, the quality of the sealing provided by the main sealing or the gripping function of the gripping element could be reduced. Furthermore, if too much dirt enters the housing, it may be difficult, if not impossible, to disconnect the tube from the tube connector. Hence, the environmental sealing is arranged for providing a sealing between an outer surface of a tube inserted into the receptacle and the housing or the cone element.

Thirdly, the connection has to withstand strong forces that aim to pull the end of the tube away from the tube connector. Hence, the gripping element holding the tube needs to be formed sufficiently robust to withstand strong forces but has to be releasable at the same time such that the tube can be disconnected from the tube connector, e.g. for maintenance purposes. To this end, the gripping element is formed as an annular body comprising a slit such that the width of the passage formed by the gripping element can be altered. Hence, to provide a tight hold of the tube the width of the passage formed by the gripping element has to be reduced. Vice versa, for releasing a tube held by a gripping element, the width of the passage formed by the gripping element has to be increased such that it disengages from an outer surface of a tube. To tighten the gripping element, i.e. to reduce the width of the passage formed by the gripping element, the cone element is provided. For releasing the grip, i.e. to increase the width of the passage formed by the gripping element, a separate release element is provided.

The interaction of the gripping element with the cone element and the release element will become apparent by the following description how a tube can be connected to a tube connector and released from the tube connector.

To connect a tube to a tube connector of the known kind, an end of the tube is simply pushed into the tube connector from the insertion end towards the abutment end. While the tube is pushed in it first passes through a passage formed by the environmental sealing element, then through a passage formed by the gripping element and finally through a passage formed by the main sealing element. When the tube is pushed through the passage formed by the gripping element the width of the passage increases such that the tube can pass through the gripping element. Here, a problem may arise. The gripping edge of the gripping element forms a pointed edge to provide a tight grip. However, if the width of the passage formed by the gripping element is not sufficiently wide, the gripping edge may damage the tube.

Once the tube has been fully inserted into the tube connector, it is tightly held by the gripping element. If an end of a tube connected to the tube connector is moved away from the abutment end, for example, if someone tries to pull the tube out of the tube connector, the gripping element engages with the cone element which limits the movement of the gripping element away from the abutment end. Thereby, also the maximum movement of the end of a tube inserted into the receptacle is limited and the tube cannot be disconnected from the tube connector. Additionally, the cone element is formed such that a width of the passage formed by the gripping element decreases further, if more force is applied to move the end of the tube away from the abutment end.

For disconnecting a tube from a tube connector, separate release elements such as the release element specified in WO 2006/11272 A1 are known. These release elements can be attached to a tube connected to a tube connector. The release element comprises a tubular part terminating in a release edge. The tubular part can be pushed into the inside of the tube connector past the environmental sealing element to move the gripping element away from the cone element towards the abutment end and increase the width of the passage formed by gripping element. Thereby, the release element facilitates a disconnection of a tube from a tube connector.

Release elements of the prior art tube connectors have to be pushed into the housing of the receptacle between the environmental sealing element and the tube. If the release element is left permanently in place, the environmental sealing element cannot function properly. Eventually, dirt and grease will enter the receptacle and proper functioning of the tube connector may be at risk. Thus, commonly the release elements are only attached to tubes whenever they are required. As the release elements are rather small they tend to get lost or are at least not at hand whenever they are needed.

Thus, there appears to be a need to provide an improved tube connector for connecting a tube of a pressurized fluid system that shares the advantages of the known tube connectors while avoiding at least some of the disadvantages such as requiring a separate release element.

According to the present invention the problem is solved by a tube connector comprising an integrated release element. The release element comprises a passage for a tube and is at least partially arranged in the receptacle. The release element is further movable in a direction pointing from the insertion end to the abutment end. The release element comprises a tubular part and an environmental sealing element. A release edge of the tubular part is adapted for engaging with the gripping element, such that the gripping element releases a tube inserted into the passage of the gripping element. Preferably, the release edge is adapted for moving the gripping element towards the abutment end and/or laterally away from a tube inserted into the passage formed by the gripping element. The environmental sealing element provides a sealing of the receptacle from an environment.

The tube connector according to the present invention is adapted for attachment of a tube of a pressurized fluid system to another part of the pressurized fluid system. Such tube connectors are designed for connecting flexible tubes which are used for conducting a pressurized fluid, e.g. air or hydraulic oil. The connector comprises a housing in which all other elements of the connector are arranged. The housing is formed around a central receptacle or cavity for holding the other elements of the connector and for providing a passage for the fluid that is transported in the pressurized fluid system.

The receptacle is delimited by two open ends of different width. A first, insertion end is provided for inserting a tube into the receptacle. A tube can be inserted into the receptacle until its end hits a second or abutment end which delimits the maximum distance the tube can be inserted into the receptacle. The abutment end nevertheless provides an opening such that a fluid that flows through the tube can also flow through the abutment end and into or out of a part of the pressurized fluid system to which the tube is connected by means of the tube connector.

The tube connector according to the present invention comprises a main sealing element, a gripping element and a cone element that are all arranged inside the housing and, to be more precise, in the receptacle in the housing. In an exemplary, preferred embodiment the main sealing element, the gripping element and the cone element can all be introduced through the insertion end into the housing to facilitate an easy assembling of the tube connector. However, other embodiments are also conceivable where the housing comprises two parts and the elements are assembled inside the receptacle before the two parts of the housing are joined.

At first the main sealing element, for example, an o-ring, is inserted into the housing. The main sealing element is preferably arranged in the receptacle for providing a sealing between an inner surface of the housing and an outer surface of a tube received in the passage of the main sealing element. IN other words, the main sealing element is adapted for engaging with an outer surface of a tube that is inserted into the tube connector and an inner surface of the housing delimiting the receptacle. In other words, the main sealing element prevents that any fluid of the pressurized fluid system is lost at the connection of a tube with the tube connector. Thus, the main sealing element has to be designed such that it can withstand the pressures that are usually employed in a pressurized fluid system for which the tube connector is intended.

The further elements, i.e. the gripping element and the cone element, interact to tightly hold a tube once it has been inserted into the tube connector. To this end the gripping element can be formed as an annular element or ring, for example, made from brass, which is cut in one position such that a width of a passage for a tube formed by the gripping element can be altered. When a tube is inserted into the tube connector, the width of the passage of the gripping element or, in short, the width of the gripping element increases such that the tube can pass through the passage formed by the gripping element. However, the gripping element is made from a resilient material such that it tries to resume its previous form and tightly grips a tube inserted into the tube connector.

The cone element is arranged between the gripping element and the insertion end of the receptacle and delimits a movement of the gripping element towards the insertion end. In other words, once the gripping element has engaged with a tube that has been inserted into the tube connector, the maximum distance the tube can be pulled out of the connectors is delimited by the cone element.

In an exemplary, preferred embodiment the cone element is formed as a separate element that is introduced into the cavity during assembly of the tube connector after the main sealing element and the gripping element have been introduced. However, it is also conceivable that the cone element is formed in a single piece with the housing of the tube connector, in particular, if the housing comprises more than one part. The cone element can, for example, further comprise an inclined surface that is shaped such that the width of the passage formed by the gripping element is reduced if a load pulling a tube inserted into the tube connector away from the abutment end increases. In other words, the cone element also forms a passage for a tube and the inclined surface is arranged such that the width of this passage decreases from the abutment end of the receptacle towards the insertion end.

Further, the tube connector comprises an integrated release element. This release element is adapted to be at least partially arranged inside the receptacle where it is movable in a direction pointing from the insertion end towards the abutment end and also in the opposite direction. The release element, like the other elements, comprises a passage for a tube through which a tube can be inserted into the tube connector.

This passage is largely formed by a tubular part of the release element that terminates in a release edge. The release edge delimits the release element towards the abutment end of the receptacle. The release edge is adapted for engagement with the gripping element. The gripping element and the release edge interact with one another such that if the release element is pushed towards the abutment end of the receptacle, the gripping element moves also towards the abutment end and away from a tube that has been inserted into the tube connector. In other words, by pushing the integrated release element towards the abutment end the width of the passage formed by the gripping element increases and the tube is eventually released from the grip of the gripping element.

The integrated release element further comprises an environmental sealing element or, in short, environmental sealing that provides a sealing of the receptacle from the environment. Hence, the environmental sealing element advantageously prevents that dirt or grease or other particles can enter the receptacle and reduce the performance of the tube connector. To this end the environmental sealing element preferably provides a sealing between a tube that has been inserted into the tube connector and the housing of the tube connector. If a sealing connection exists between the housing and the cone element, it may also be sufficient if the environmental sealing element provides a tight sealing between a tube inserted into the tube connector and the cone element.

The tube connector according to the present invention advantageously provides a release element that is permanently in place, such that a tube that has been connected to the tube connector can be released at any time from the tube connector, for example, for maintenance purposes. At the same time the release element ensures that the receptacle is sealed off the environment by the environmental sealing element to prevent that dirt and dust get into the receptacle, reduce the sealing capacity of the main sealing element or block the gripping element such that the release tool cannot be used anymore to detach a tube from the tube connector. Furthermore, the release element and, in particular, the tubular part of the release element also facilitate inserting a tube into the tube connector. A tube inserted into the tube connector is guided essentially all the way to the gripping element by the tubular part of the release element. In prior art tube connectors the tubes where either not guided at all or guided by the environmental sealing means only. Thus, the tubes could cant when pushed into the tube connector which makes it more difficult to insert the tube.

Preferably, the integrated release element comprises a top part providing an actuation surface for pushing the release element towards the abutment end.

In a preferred embodiment the environmental sealing element is adapted for sealing the release element towards an inner surface of the housing and towards an outer surface of a tube inserted into the passage formed to by the release element. In the preferred embodiment, all parts of the tube connector such as the cone element, the gripping element and the main sealing element are protected from any environmental influences by the environmental sealing element.

In a preferred embodiment the environmental sealing element is formed in one piece and from a first plastic material. In other words, those parts of the environmental sealing element providing a sealing between the release element and a tube inserted into the passage formed by the release element and those parts of the environmental sealing element providing a sealing between the integrated release element and the inner surface of the housing are joint to one piece. In an exemplary, preferred embodiment the first plastic material has a Shore hardness A in the range 50 to 70. It is further preferred, that the first plastic material comprises, for example, a thermoplastic elastomer.

It is further preferred that the top part and the tubular part of the environmental release element are also formed in one piece and from a second plastic material. Hence, in the preferred embodiment an environmental sealing element formed in a single piece provides a sealing on the one hand between a tubular part of the release element and a tube inserted into the passage formed by the release element and on the other hand between the tubular part and/or the top part of the release element and the housing of the tube connector. By providing both the tubular part and the top part of the release element and the environmental sealing element each in a single piece, the release element can advantageously be produced in a 2K or two component injection molding process which reduces production cost and time. A 2K injection molding method suitable for producing integrated release elements according to the present invention is described in EP 0 341 880 B1.

In an exemplary, preferred embodiment the second plastic material has a shore D hardness in the range of 65 to 85. It is further preferred that the second plastic may comprise polyamide and, in particular, a fiber reinforced polyamide. Preferably, those parts of the release element made from the second plastic material completely consist of such fiber reinforced polyamide. In an exemplary, further preferred embodiment the polyamide used in the fiber reinforced polyamide is polyamide 12.

In a further preferred, exemplary embodiment the second plastic material comprises fiber reinforced polyamide with a fiber content in the range of 30 to 50 vol. %. Such material selection allows providing a release element with improved impact strength. Typically a content of 30 to 50 vol. % can increase the impact strength of the component 2 to 3 times, depending on the design of the component, compared to polyamide materials without reinforcing fibers.

In a preferred embodiment the tubular part and the top part are connected by at least four evenly distributed bridge parts, wherein the bridge parts are formed from the second plastic material and gaps or channels between the bridge parts are filled with the first plastic material. In other words, the one piece forming the top part and the tubular part has at least four evenly distributed gaps arranged preferably in form of an "X", a "+" or a cross. Between these gaps the bridge parts connect the top part and the tubular part and are made from the same second plastic material like the top part and the tubular part. The gaps are filled with the first plastic material forming the environmental sealing. In other words, the environmental sealing extends through the gaps from a part of the environmental sealing element engaging with the housing of the tube connector to a part of the environmental sealing element engaging with an outer surface of a tube inserted into tube connector.

Providing at least four evenly distributed gaps or bridge element is advantageous when the release element is to be formed in a single two component or 2K injection molding process. First, the tubular part, the top part and the bridge parts are injection molded in a first step using the second plastic material. Then, the environmental sealing element is injection molded in a second step using the first plastic material. By providing at least four evenly distributed gaps the first plastic material can easily flow through the already molded parts of the release element. Thus, the preferred embodiment allows for an improved injection molding process which improves the quality of the created product and reduces the production time and cost required to create the release element.

It is further preferred that the cone element and the release element are formed such that a load due to a radial extension of a tube inserted into the passage formed by the release element is transferred via the cone element and the environmental sealing to the inner surface of the housing. In other words, the release element and, in particular, its environmental sealing element are formed such that the environmental sealing element extends at least partly between the cone element and the surrounding housing of the tube connector. The elements are further designed such that the pressure of a pressurized fluid flowing inside a tube that has been inserted into the tube connector acts radially outward from the tube onto the cone element and from the cone element via the environmental sealing element onto the inner wall of the housing. Hence, if the pressurized fluid system is under operating pressure the sealing of the receptacle from the environment is further improved.

In a preferred embodiment the gripping element comprises an inclined surface such that a width of the passage for a tube formed by the gripping element increases in a direction pointing from the abutment end to the insertion end. In other words, the gripping element is designed such that it has an inclined surface which at least partially delimits the passage formed by the gripping element. The inclination of this inclined surface is arranged such that the width of the passage decreases from the insertion end of the receptacle towards the abutment end of the receptacle, whereby a tube that is pushed into the tube connector may increase the width of the passage provided by the gripping element. Thereby, damages of the tube by the gripping element are prevented.

In a further preferred embodiment the tube connector comprises a support sleeve for increasing rigidity of a tube inserted into the tube connector.

In a preferred embodiment the top part of the release element forms a collar extending at least partially between the cone element and the inner surface of the housing, wherein a first protrusion is formed at the top element and a second protrusion is formed at the cone element, wherein the first protrusion and the second protrusion are adapted to engage for delimiting a maximum movement of the release edge in a direction away from the abutment end to a first predefined distance. The first and the second protrusion or projection advantageously interact to provide a stop for the release element such that it cannot move any further out of the receptacle and always remains in place. It is preferred that protrusions are formed as closed annular protrusions or projections extending once around the respective elements.

It is further preferred that the cone element comprises a third protrusion, wherein the first protrusion and the third protrusion are adapted to engage for delimiting a maximum movement of the release edge in a direction away from the abutment end to second predefined distance, wherein the second predefined distance is less than a first distance. In this preferred embodiment two stops are provided both limiting the movement of the release element away from the abutment end. In normal operation the release element can only move out of the receptacle until the first protrusion engages with the third protrusion. If however, strong loads are applied to a tube inserted into the tube connector without using the release element to release the tube, the release element, and in particular, the first protrusion can be pushed past the third protrusion. The second protrusion then serves as a further stop to prevent the release element from getting lost. At the same time the release element sticks further out of the housing than normal such that it serves as an indicator that high loads have been acting on the tube and the tube connector. Thus, the connection may require maintenance or at least review.

In a further preferred embodiment the first protrusion, the second protrusion and/or the third protrusion are adapted to provide a direct load path from the cone element via the environmental sealing to the inner surface of the housing. Thus, the protrusions improve a sealing of the environmental sealing element if a fluid in a tube inserted into the tube connector is under pressure.

It is further preferred that a biasing means is provided for biasing the release element in a direction pointing away from the abutment end. By providing such a biasing means unintentional release of a tube can be prevented.

The environmental sealing is adapted in a further embodiment for engaging with the tube that is being inserted into the passage of the release element such that the release element moves in the same direction as the tube being inserted into the receptacle. Thereby, when inserting a tube into the tube connector the release edge of the release element advantageously engages with the gripping element and pushes the gripping element towards the abutment end. In other words, when inserting a tube into the tube connector the environmental sealing element attaches tightly to the tube such that it moves along with the tube and pushes the gripping element from a gripping position into a release position. Then the tube can be inserted without any risk of damage, such as scratches in an outer surface of the tube inflicted by the pointy or sharp gripping edge.

At the same time in the preferred embodiment the environmental sealing gripping a tube inserted into the tube connector sufficiently tightly also prevents unintended release of a tube from the tube connector. If loads are applied to a tube such that it moves away from the release edge, the release element moves with the tube and, hence, the release edge of the release element moves away from the gripping element such that the gripping element can either grip the tube more tightly or at least an unintended or accidental engaging of the release edge with the gripping element is prevented. Thus, in summary a tight grip to a tube by the environmental sealing advantageously prevents damages when inserting the tube and also secures the tube connector against accidental releases. This functioning is not only a matter of a choice of the correct dimension of the release element and, in particular, the environmental sealing element but also a matter of the correct choice of materials forming the parts of the release element.

Figure 2A:
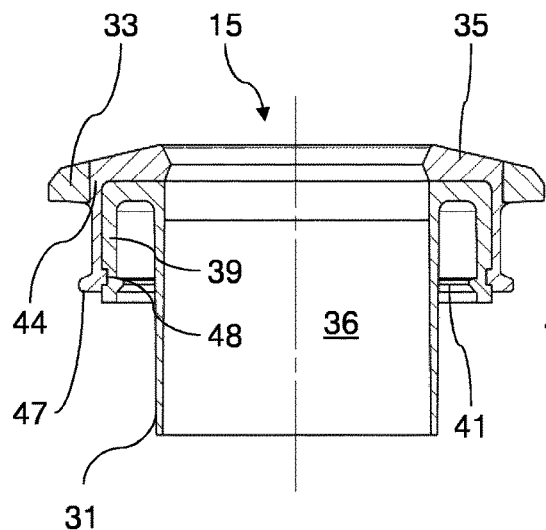
Figure 2B:
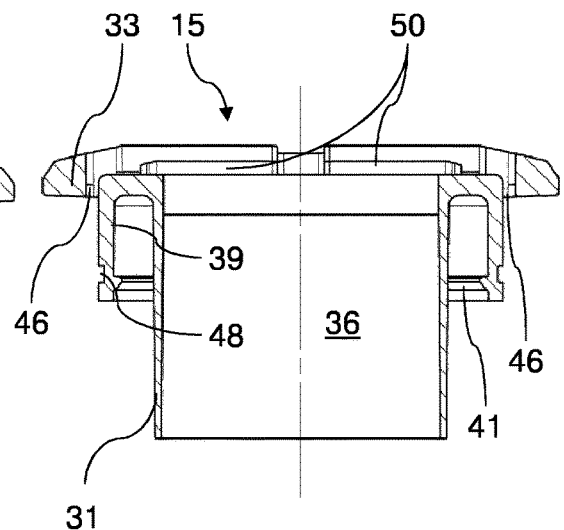
Figure 2C:
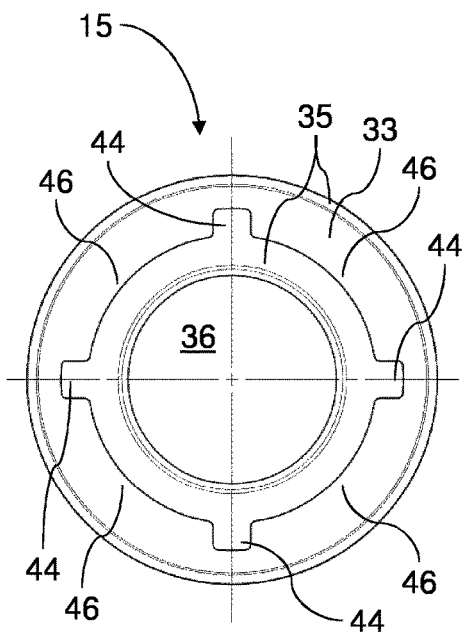
Figure 2D:
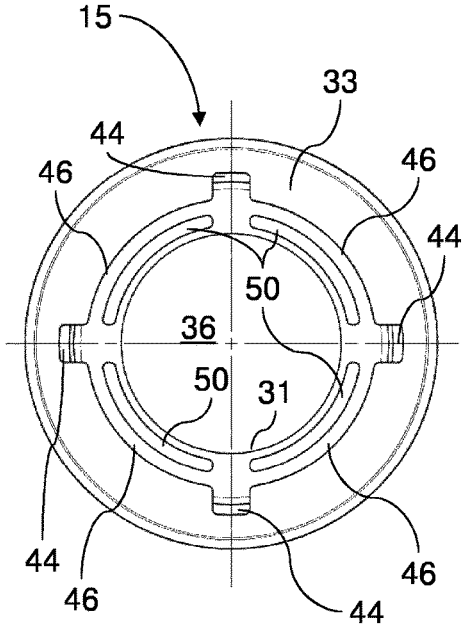
Figure 3:
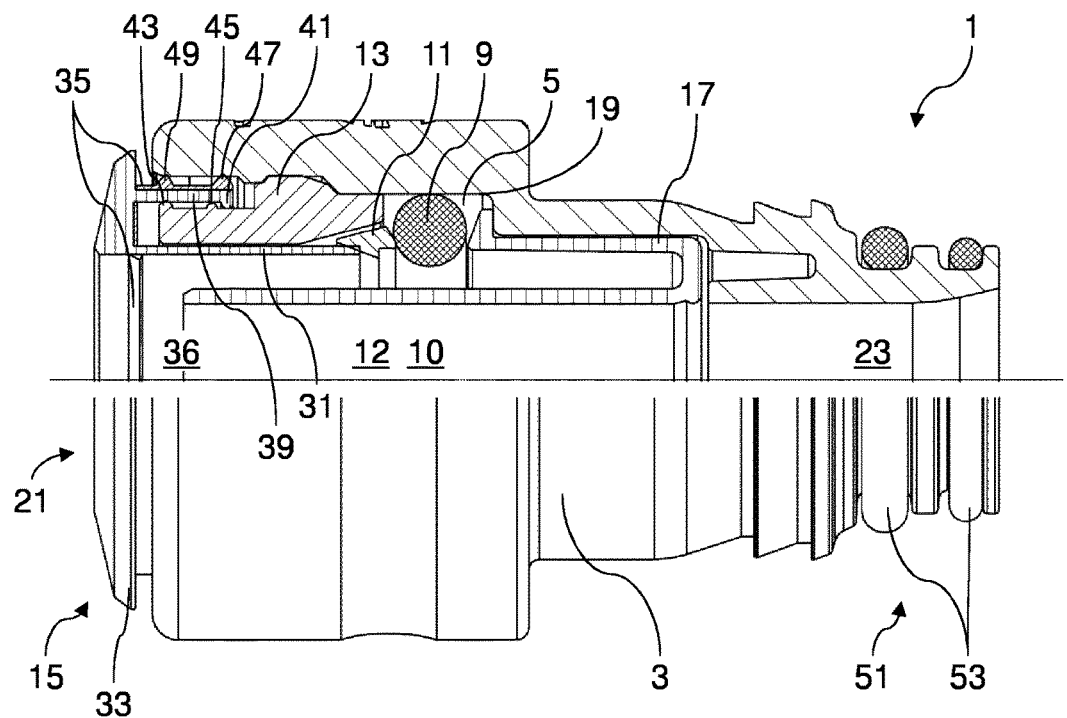
Figure 4:
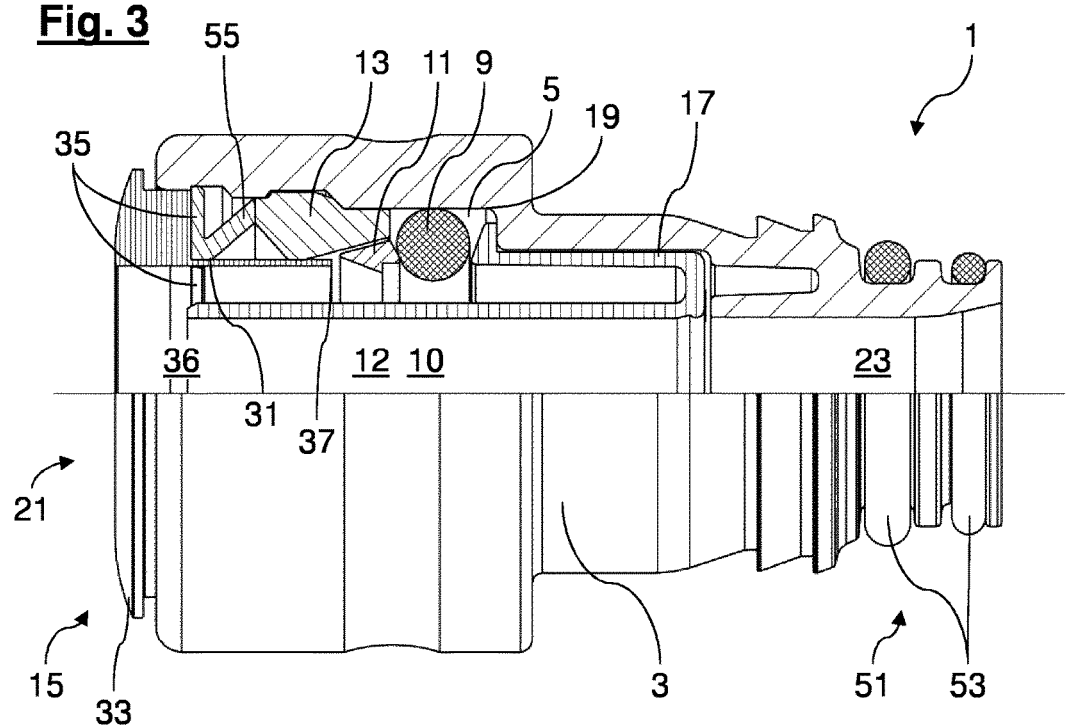

In the following preferred embodiments of the invention are further described in more detail with reference to the Figures, wherein FIG. 1 shows a partially sectional and partially perspective view of a first exemplary embodiment of a tube connector according to the present invention, FIG. 2a shows a sectional view of a release element of the exemplary embodiment of a tube connector shown in FIG. 1, FIG. 2b shows a sectional view of the release element of FIG. 2a without an environmental sealing element, FIG. 2c shows a top view of the release element of FIGS. 2a and 2b, FIG. 2d shows a top view of the release element of FIGS. 2a, 2b and 2c without the environmental sealing, FIG. 3 shows a sectional view of a second exemplary embodiment of a tube connector according to the present invention and FIG. 4 shows a sectional view of a third exemplary embodiment of a tube connector according to the present invention.

Throughout the different embodiments shown in the Figures like elements will be denoted with like reference numerals.

In FIG. 1 a first embodiment of a tube connector 1 according to the present invention is shown. The tube connector 1 comprises a housing 3 having a cavity or receptacle 5 for receiving a tube 7 and several elements 9, 11, 13, 15. The tube 7 and, hence, also the tube connector 1 are part of a pressurized fluid system which is used for conducting a pressurized fluid, such as a braking system of a vehicle. The fluid can, for example, be air or hydraulic oil. The elements 9, 11, 13, 15 arranged in the receptacle 5 are a main sealing element 9, a gripping element 11, a cone element 13 and an integrated release element 15. Also arranged inside the receptacle 5 is a support sleeve 17, which stiffens or supports a flexible tube 7 once it has been fully inserted into the receptacle 5 of the tube connector 1. The tube 7 shown in FIG. 1 inside the tube connector 1 is shown only for illustrative purposes and is not part of the present invention.

The receptacle 5 formed by the housing 3 of the tube connector is delimited by an inner surface 19 and two open ends 21, 23. The first open end 21 is also referred to as an insertion end 21 through which and from which the tube 7 and all elements 9, 11, 13, 15, 17 can be inserted into the receptacle 5. The second end 23 is also referred to as an abutment end 23. The abutment end 23 comprises an opening through which a fluid of the pressurized fluid system can flow in and out of the tube connector 1.

The main sealing element 9 is an o-ring made from an elastic plastic material such as rubber and forms a passage 10 for receiving a tube 7. It is adapted to provide a tight sealing between the tube 7, and to be more precise an outer surface 24 of a tube 7, once it has been inserted into the tube connector 1 and an inner surface 19 of the housing 3 of the tube connector 1. The sealing provided by the main sealing element 9 is sufficiently tight to prevent fluid of the pressurized fluid system from evading the pressurized fluid system at the connection of the tube connector 1 and the tube 7.

Adjacent to the main sealing element 9 the gripping element 11 is arranged. The gripping element 11 is formed as an annual brass ring comprising a slit. The slit, which is not shown in the Figures, facilitates that a width of a passage 12 for the tube 7 formed by the gripping element 11 is variable. Hence, if a tube 7 is inserted into the receptacle 5 and, in particular, in the passage 12 formed by the gripping element 11, this passage 12 expands such that the tube 7 may be easily pushed into the tube connector 1. However, the gripping element 11 is formed from a resilient material such that it tries to return into its original shape and provides a tight grip around a tube 7 while the tube 7 is in place. In particular, as the tube 7 is usually made from a flexible plastic material, a gripping edge 25 of the gripping element 11 will at least slightly deform the tube 7 to provide a tighter grip.

The gripping element 11 provides an inclined surface 27 which is arranged such that the width of the passage 12 formed by the gripping element 11 increases from the abutment end 23 towards the insertion end 21. The inclined surface 27 facilitates an easier insertion of a tube 7 and prevents damages of an outer surface 24 of the tube 7 by the pointy or sharp gripping edge 25.

To prevent that a tube 7 that has been inserted into the tube connector 1 can be pulled out, the cone element 13 is provided in the receptacle 5. In the exemplary embodiment shown in FIG. 1 the cone element 13 is shown as a distinct or separate element. However, it is also conceivable that the cone element 13 is formed in one piece with the housing 3. The cone element 13 comprises an inclined surface 29 which is adapted for engagement with the gripping element 11. The inclined surface 29 is shaped such that a width of a passage for a tube 7 provided by the cone element 13 decreases from the abutment end 23 towards the insertion end 21. Thereby, if a load acts on the tube 7 such that the tube 7 is moved away from the abutment end 23 the gripping element 11 engages with the inclined surface 29 and the width of the passage 12 formed by the gripping element 11 is decreased more and more, the more load is applied. Thus, a self-tightening gripping mechanism is provided.

Further, the integrated release element 15 is also partially arranged in the receptacle 5. The integrated release element 15 comprises a tubular part 31, a top part 33 and an environmental sealing element 35 and also forms a passage 36 for receiving a tube 7. The tubular part 31 of the release element 15 extends between a tube 7 and the cone element 13. The tubular part 31 guides a tube 7 inserted into the tube connector 1. Thereby, insertion of a tube 7 is facilitated as the tube 7 cannot cant, twist or get stuck at an environmental seal as known from prior art tube connectors, the cone element 13 or even the gripping element 11. The tubular part 31 terminates towards the abutment end 23 in a release edge 37 which is adapted for pushing the gripping element 11 from a gripping to a non-gripping position if the release element 15 is moved towards the abutment end 23. In other words, the release edge 37 pushes the gripping element 11 towards the abutment end 23 and also radially away from a tube 7.

The top part 33 of the integrated release element 15 is formed as an actuating surface for pushing the integrated release element 15 towards the abutment end 23. Furthermore, the top part 33 is formed such that it limits the maximum distance the release element 15 can be pushed into the receptacle 5 as the top part 33 is adapted to engage with the housing 3.

The environmental sealing part or short environmental sealing 35 of the release element 15 seals the inner part of the housing 3, i.e. the receptacle 5, from the environment to prevent dirt from entering the interior of the tube connector 1. If dirt enters the interior of the housing 3, the sealing capacity of the main sealing element 9 may be reduced or it may not be possible to release the gripping element 11 anymore. Advantageously, the environmental sealing 35 is adapted to engage with a tube 7 if it is inserted into the tube connector 1 in such a manner that the gripping element 11 moves towards the abutment end 23 with the tube and pushes the gripping element 11 towards an open or non-gripping position such that the tube 7 can be inserted with little or preferably no contact to the gripping edge 25 of the gripping element 11. Thereby, damages to the tube 7 like scratches on its outer surface 24 created by the pointy gripping edge 25 are prevented.

Additionally, by engaging with the outer surface 24 of the tube 7 the environmental sealing element 35 also prevents unintended or accidental releases of the tube 7 from the tube connector 1. As the release element 15 moves within the boundaries defined by the gripping element 11 and stops described in detail in the following paragraphs, when the tube 7 is pulled away from the abutment end 23, the release element 15 also moves away from the abutment end 23. Hence, accidental engaging of the release edge 37 with the gripping element 11 which could cause an unintended release of the tube 7 is prevented.

The environmental sealing 35 is also adapted to engage with the housing 3. To provide a tight sealing the top part 33 of the release element 15 is formed in form of a collar 39 that extends at least partially between the cone element 13 and the housing 3. The collar 39 and the cone element 13 are formed such that a radial extension of a tube 7 caused by a pressure of a fluid inside the tube 7 is transferred through the cone element 13 and the collar 39 onto the environmental sealing 35 to improve a tightness of the environmental sealing 35. In other words, the cone element 13 and the collar 39 provide a load path onto the environmental sealing 35 towards the inner surface 19 of the housing 3. The environmental sealing 35 comprises a projection or protrusion 47 for sealing engagement with the inner surface 19. The protrusion 47 also facilitates a local and, thus, direct load transfer of radial forces created by a pressurized fluid in a tube 7 in the tube connector 1.

The top part 33 of the release element 15 comprises a first protrusion 41 adapted for engagement with a second protrusion 43 which is formed at the cone element 13. The protrusions 41, 43 are formed to provide a stop for the release element 15. By means of the protrusions 41, 43 the release element 15 cannot be pulled further away from the abutment end 23 than a predefined distance which is defined by the position of the protrusion 41, 43. Thus, the protrusions 41, 43 advantageously prevent that the release element 15 moves away from the rest of the tube connector 1.

Furthermore, the protrusions 41, 43 provide an advantageous load path as described in the preceding paragraph for transferring radial loads of a tube 7 onto the environmental sealing 35.

The tube connector 1 shown in FIG. 1 further comprises a connecting end 51 with two sealing means 53 in the form of orings for providing a sealed connection of the tube connector 1 to another part of a pressurized fluid system.

FIGS. 2a, 2b, 2c and 2d show different detailed views of the integrated release element 15 of the exemplary embodiment of a tube connector 1 of FIG. 1. FIGS. 2a and 2b show the same sectional view of the release element 15, however, in FIG. 2b the environmental sealing element 35 has been omitted to show details of the further parts of the release element 15. Likewise, FIGS. 2c and 2d show the same top view of the integrated release element 15. In FIG. 2c the environmental sealing element 35 is in place, whereas in FIG. 2d it has been omitted.

As can be seen in FIG. 2a the environmental sealing element 35 is formed in one piece, i.e. the environmental sealing element 35 extends continuously from the passage 36 of the release element 15 through gaps 44 provided in the remainder of the release element 15 all the way to the protrusions 47 provided for engagement with the inner surface 19 of the housing 3 of the tube connector 1. As can be seen in FIGS. 2c and 2d four gaps 44 are provided that are evenly distributed in a circumferential direction and are arranged to form an "X", a "+" or a cross. Between the channels or gaps 44 bridge parts 46 are provided connecting the top part 33 of the integrated release element 15 with the tubular part 31. As the gaps 44 are evenly distributed, so are the bridge parts 46.

Providing the evenly distributed gaps 44 in the other parts of the release element 15 advantageously allows producing the release element 15 in a two component or 2K injection molding process. In the injection molding process first the tubular part 31, the top part 35 and the collar 39 are molded from a second plastic material.

The second material is preferably a 30 vol. % glass fibre reinforced, heat stabilized polyamide 12. Such a material has the following mechanical properties:

|  |  | Standard | Unit | State |  |
|---|---|---|---|---|---|
| Tensile E-Modulus | 1 mm/min | ISO 527 | MPa | cond. | 6000 |
| Tensile strength at break | 5 mm/min | ISO 527 | MPa | cond. | 105 |
| Elongation at break | 5 mm/min | ISO 527 | % | cond. | 8 |
| Impact strength | Charpy, 23° C. | ISO 179/1eU | $kJ/m^2$ | cond. | 80 |
| Impact strength | Charpy, −30° C. | ISO 179/1eU | $kJ/m^2$ | cond. | 80 |
| Notched impact strength | Charpy, 23° C. | ISO 179/1eA | $kJ/m^2$ | cond. | 20 |
| Notched impact strength | Charpy, −30° C. | ISO 179/1eA | $kJ/m^2$ | cond. | 15 |
| Shore hardness D |  | ISO 868 | — | cond. | 77 |

The abbreviation cond. stands for "conditioned".

In a second step of the 2K injection molding process the environmental sealing element 35 is injected using a first plastic material. The first plastic material is a thermoplastic elastomer. By providing the four gaps 44 in an evenly distributed manner, injection molding the environmental sealing 35 from a thermoplastic elastomer is facilitated as the material can easily flow through the gaps 44 into a tool provided for molding the release element 15. For providing a permanent coupling between those parts of the release element 15 formed from the second plastic material and the environmental sealing element 35 a circumferential groove 48 is provided at the collar 39. Further, at the bridge parts 46 projections or rips 50 are molded which are also intended to improve a connection between the parts 31, 33, 35, 39, 46 of the release element 15 that are formed from different plastic materials.

A second embodiment of a tube connector 1 is shown in FIG. 3. Only those features of the tube connector 1 shown in FIG. 3 will be described in more detail that differ from the tube connector 1 shown in FIG. 1. Please note that in FIG. 3 a tube 7 is not shown.

The tube connector 1 shown in FIG. 3 differs from the tube connector 1 of FIG. 1 in specific details of the cone element and the environmental sealing 35. In particular, a third protrusion 45 is formed at the cone element 13. This third protrusion 45 is also adapted for engagement with the first protrusion 41 formed at the collar 39 of the release element 15. However, contrary to the second protrusion 43 the distance of the third protrusion 45 from the abutment end 23 is smaller. Thus, in an advantageous manner the cone element 13 provides two distances in which the integrated release element 15 is held in the receptacle 5. In normal operation the release element 15 is arranged such that the first protrusion 41 is always in between the abutment end 23 and the third protrusion 45. In case of excessive loads pulling a tube 7 out of the receptacle 5, the release element 15 moves past the third protrusion 45 and stops at the second protrusion 43. Once the excessive loads are not applied to the tube 7 anymore, it does not move in all the way past the third protrusion 45. The first protrusion 41 stays between the second and the third protrusion 43, 45. Thus, a person inspecting the tube connector 1 as shown in FIG. 3 can see that the release element 15 has been subject to high loads and may need maintenance.

Additionally, the embodiment of a tube connector 1 shown in FIG. 3 also has a slightly differently shaped environmental sealing 35 having two annularly closed projections or protrusions 47, 49 which engage with the inner surface 19 of the housing 3 to provide a better sealing of the receptacle 5 from the environment. The protrusions 47, 49 formed by the environmental sealing 35 are arranged such that in a normal operating position as shown in FIG. 3 they are arranged at the same distance from the abutment end 23 as the second and the third protrusion 43, 45. Thus, a direct load path is formed from a tube 7 through the cone element 13, the second and third protrusion 43, 45 and the protrusions 47, 49 formed by the environmental sealing element 35 to the housing 3 and a tight sealing is provided.

Finally, FIG. 4 shows a third exemplary embodiment of a tube connector 1 according to the present invention. With regard to FIG. 4 only the different embodiment of the environmental sealing element 35 will be described in more detail. The environmental sealing element 35 as shown in FIG. 4 is formed to provide a biasing means 55 for biasing the release element 15 away from the abutment end 23 of the tube connector 1. Thereby, unintended engagement of the release edge 37 of the integrated release element 15 with the gripping element 11 and, thus, unintended release of a tube 7 from the tube connector 1 can be prevented. For biasing the release element 15 away from the abutment end 23 the environmental sealing element 35 and, in particular, the biasing part 55 of the environmental sealing element 35 engages with the cone element 13. If the release element 35 is moved or pushed towards the abutment end 23, the biasing part 55 of the environmental sealing element is compressed. However, as the environmental sealing element 35 and also the biasing part 55 are made from an elastic or resilient material, the environmental sealing element 35 will resume its previous form as soon as no further pressure is applied to the release element 15. Thus, the biasing part 55 will push the release element 15 away from the abutment end and advantageously prevents unintended engagement of the release edge 37 with the gripping element 11.

The invention claimed is:

1. A tube connector (1) for attachment to a tube (7) of a pressurized fluid system, wherein the tube connector (1) comprises:
   a housing (3), a main sealing element (9), a gripping element (11) and a cone element (13),
   the housing (3) comprising a receptacle (5) for receiving the tube (7), the receptacle (5) being delimited by an insertion end (21) for which the tube (7) can be inserted into the receptacle (5), and an abutment end (23) for delimiting a maximum insertion of the tube (7) into the housing (3),
   the main sealing element (9) being provided for preventing a fluid from flowing out of a pressurized fluid system at a connection of the tube (7) and the tube connector (1),
   the gripping element (11) comprising a passage (12) for receiving the tube (7), the gripping element (11) being arranged in the receptacle (5) and comprising a gripping edge (25) for engaging with an outer surface (24) of the tube (7) received in the passage (12) of the gripping element (11), wherein the gripping element contacts the main sealing element,
   the cone element (13) being arranged in the receptacle (5) for delimiting a movement of the gripping element (11) towards the insertion end (21),
   the tube connector (1) further comprising an integrated release element (15) arranged at least partially in the receptacle (5) and movable along a direction pointing from the insertion end (21) to the abutment end (23), the release element (15) comprising a passage (36) for the tube (7), a tubular part (31) and an environmental sealing element (35),
   a release edge (37) of the tubular part (31) being adapted for engaging with the gripping element (11) and moving the gripping element (11), such that the gripping element (11) releases the tube (7) inserted into the passage (12) of the gripping element (11),
   the environmental sealing element (35) providing a sealing of the receptacle (5) from an environment, and
   the environmental sealing element (35) being adapted for sealing the release element (15) towards an inner surface (19) of the housing (3) and towards the outer surface (24) of the tube (7) inserted into the passage (36) of the release element (15), wherein:
   the integrated release element (15) comprises a top part (33) providing an actuation surface for pushing the release element (15) towards the abutment end (23),
   the top part (33) of the release element (15) forms a collar (39) extending at least partly between the cone element (13) and the inner surface (19) of the housing (3), a first protrusion (41) is formed at the top part (33) and a second protrusion (43) is formed at the cone element (13), and
   the first protrusion (41) and the second protrusion (43) are adapted to engage for delimiting a maximum movement of the release edge (37) in a direction away from the abutment end (23) to a first predefined distance.

2. A tube connector (1) according to claim 1, wherein the environmental sealing element (35) is formed in one piece and from a first plastic material.

3. A tube connector (1) according to claim 2, wherein the tubular part (31) and the top part (33) are connected by at least four evenly distributed bridge parts (46), the bridge parts (46) being formed from the second plastic material and gaps (44) between the bridge elements (46) being filled with the first plastic material.

4. A tube connector (1) according to claim 2, wherein the top part (33) and the tubular part (31) are formed in one piece and from a second plastic material, the first plastic material differing from the second plastic material.

5. A tube connector (1) according to claim 2, wherein the top part (33) of the release element (15) forms a collar (39) extending at least partly between the cone element (13) and the inner surface (19) of the housing (3), a first protrusion (41) is formed at the top part (33) and a second protrusion (43) is formed at the cone element (13), wherein the first protrusion (41) and the second protrusion (43) are adapted to engage for delimiting a maximum movement of the release edge (37) in a direction away from the abutment end (23) to a first predefined distance.

6. A tube connector (1) according to claim 1, wherein the top part (33) and the tubular part (31) are formed in one piece and from a second plastic material, the first plastic material differing from the second plastic material.

7. A tube connector (1) according to claim 6, wherein the tubular part (31) and the top part (33) are connected by at least four evenly distributed bridge parts (46), the bridge parts (46) being formed from the second plastic material and gaps (44) between the bridge elements (46) being filled with the first plastic material.

8. A tube connector (1) according to claim 1, wherein the cone element (13) comprises a third protrusion (45), wherein the first protrusion (41) and the third protrusion (45) are adapted to engage for delimiting a maximum movement of the release edge (37) in a direction away from the abutment end (23) to a second predefined distance, wherein the second predefined distance is less than the first distance.

9. A tube connector (1) according to claim 8, wherein the first protrusion (41), the second protrusion (43) and/or the third protrusion (45) are adapted to provide a direct load path from the cone element (13) via the environmental sealing element (35) to the inner surface (19) of the housing (3).

10. A tube connector (1) according to claim 1, wherein the first protrusion (41), the second protrusion (43) and/or a third protrusion (45) are adapted to provide a direct load path from the cone element (13) via the environmental sealing element (35) to the inner surface (19) of the housing (3).

11. A tube connector (1) according to claim 1, wherein the cone element (13) and the release element (15) are formed such that a load due to a radial extension of the tube (7) inserted into the passage (36) of the release element (15) is transferred via the cone element (13) and the environmental sealing element (35) to the inner surface (19) of the housing (3).

12. A tube connector (1) according to claim 1, wherein the release edge (37) of the tubular part (31) is adapted for engaging with the gripping element (11) and moving the gripping element (11) towards the abutment end (23) and/or away from the tube (7) inserted into the passage (12) of the gripping element (11), and the gripping element (11) comprises an inclined surface (27) such that a width of the passage (12) for the tube (7) formed by the gripping element (11) increases in a direction pointing from the abutment end (23) to the insertion end (21).

13. A tube connector (1) according claim 1, wherein the tube connector (1) further comprises a support sleeve (17) for receiving an end of the tube (7) inserted into the receptacle (5).

14. A tube connector (1) according to claim 1, further comprising a biasing means (55) for biasing the release element (15) in a direction pointing away from the abutment end (23).

15. A tube connector (1) according to claim 1, wherein the environmental sealing element (35) is adapted for engaging with the tube (7) that is inserted into the passage (36) of the release element (15) such that the release element (15) moves in the same direction as the tube (7) inserted into the receptacle (5).

16. A tube connector according to claim 1, wherein the main sealing element (9) comprises a passage (10) for receiving the tube (7) and wherein the main sealing element (9) is arranged in the receptacle (5) for providing a sealing between an inner surface (19) of the housing (3) and an outer surface (24) of the tube (7) received in the passage (10) of the main sealing element (9).

* * * * *